Jan. 24, 1950 — L. W. MUELLER — 2,495,593
METER STOP
Filed June 11, 1945
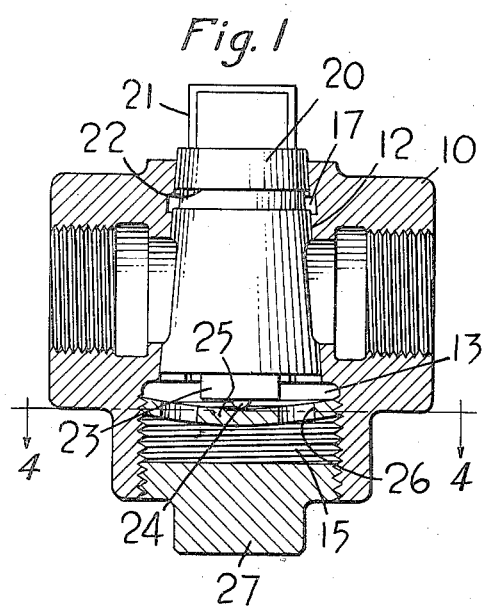
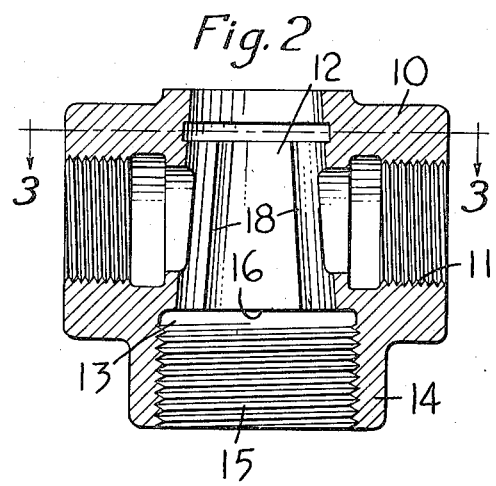
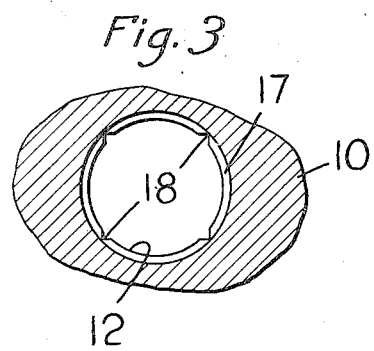
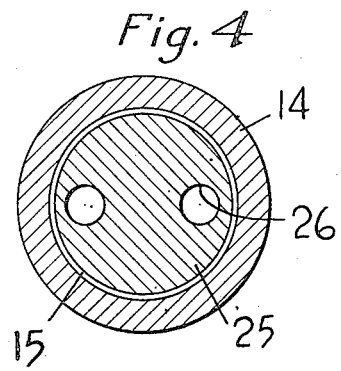
INVENTOR.
Lucien W. Mueller
BY
Cushman, Darby & Cushman
Attorneys Patented Jan. 24, 1950

2,495,593

UNITED STATES PATENT OFFICE 2,495,593

METER STOP

Lucien W. Mueller, Decatur, Ill., assignor to Mueller Co., Decatur, Ill., a corporation of Illinois Application June 11, 1945, Serial No. 598,757

2 Claims. (Cl. 251—93)

The present invention relates to meter stops.

The pipe line which connects a gas main to a residence ordinarily has a gas meter connected therein, and it is customary to also place a meter stop in this line on the inlet side of the meter. The purpose of the stop is to enable the flow of gas to the meter to be cut off, but because the flow is seldom cut off except when a change of occupancy occurs, a meter stop may not be operated for a great number of years.

Because such stop is only actuated at long intervals, its plug may become seized. For that reason, the plug is tapered and its smaller end projects from the casing so that it may be struck with a hammer to unseize the plug. Also, such a stop is usually provided with means to lubricate the seating surface. The lubricating arrangement ordinarily comprises a lubricant chamber formed in the casing beyond the larger end of the plug and closed by a cap threaded in the casing. Lubricant is supplied to the chamber by removal of the cap and inward threading of the cap increases the pressure upon the lubricant to thereby force it to the seating surface.

It previously has been proposed to provide a spring in the lubricant chamber with one end thereof bearing on the larger end of the plug, and the opposite end of the spring bearing upon the lubricant cap. Due to the fact that a meter stop is usually mounted with its smaller end uppermost and accessible for an unseating blow, the spring and plug may fall from the bottom of the stop when the lubricant cap is removed. Dropping of the plug from the stop results in a serious though temporary loss of gas, and may result in marring the plug.

One purpose of providing a spring at the larger end of the plug has been to return the plug to its seat after it has been tapped to unseize it. However, when the plug is tapped, its larger end will be moved further into the lubricant chamber, thereby forcing lubricant from the chamber and up along the plug to the seating surface. This is a desirable result of the tapping action, whereas if the spring is sufficiently powerful to fully restore the plug to its original position, lubricant is driven back to the lubricant chamber from the seating surface.

It will be noted that if a spring is placed between the larger end of the plug and the lubricant cap, any inward movement of the lubricant cap for the purpose of forcing additional lubricant to the seating surface also increases the seating pressure applied to the plug by the spring. Therefore, when the operator is rotating the lubricant cap inwardly to force grease to the seating surface between the plug and casing, he is simultaneously forcing the plug closer to its seat by compressing the spring. This effect of the spring may hold the plug so tightly sealed that, for all practical purposes, it is rigidly seated. Rigid seating of the plug is highly undesirable because it necessitates such a sharp hammer blow for unseating that the stop and also the gas line may be affected.

An object of the present invention is to provide a meter stop which includes means to hold the plug in the casing when the lubricant cap is removed, but which cannot interfere with the unseating action applied to the plug by a hammer blow.

Another object of the invention is to provide a meter stop wherein the plug is held seated primarily by lubricant pressure.

A further object of the invention is to provide a meter stop including means to retain the plug in its seat and which means is not affected by any movement of the lubricant cap.

Other objects and advantages of the invention will be apparent from the following specification and accompanying drawings, wherein—

Figure 1 is a central vertical sectional view through the meter stop of the present invention.

Figure 2 is a central vertical sectional view of the casing.

Figure 3 is a transverse section on the line 3—3 of Figure 2, and

Figure 4 is a transverse section on the line 4—4 of Figure 1.

Referring to the drawings, the numeral 10 designates the casing of the stop which includes a flow line 11 and a tapered seat 12 extending transversely of the flow line. The smaller end of the tapered seat opens to the exterior of the casing and its larger end opens to a lubricant chamber 13 formed by a flange 14 on the casing. The inner wall of the lubricant chamber is provided with threads 15 extending to a point closely adjacent the shoulder 16 which defines the larger end of the seating surface 12.

The seating surface 12 of the casing 10 includes a circumferential groove 17 at a point between the flow line ports and the smaller end of the casing, and longitudinally extending grooves 18 may extend from the groove 17 to the shoulder 16 as shown in Figure 2. Four grooves 18 may be provided in the seating surface, these grooves being equidistantly spaced and so arranged that two of them will be between each flow line port, as illustrated in Figure 2.

The plug 20 has its smaller end projecting from the casing as shown in Figure 1, and is provided at that end with an operating shank 21. The plug includes a flow port to control passage through the flow line 11 of the casing, and is also provided with a circumferential groove 22 normally adapted to be substantially opposite the circumferential groove 17 of the casing. At its larger end, the plug may be provided with a central projection 23 containing a depression or socket to receive a hardened steel ball 24 which bears upon a disc or plug securing element 25. Disc 25 includes threads on its periphery to engage the threads 15 of the lubricant chamber 13. It also includes apertures 26 offset from its center as shown in Figures 1 and 4 and through which lubricant may move. In order to permit the plug to be unseated and unseized by a hammer blow upon its operating shank 21, the disc may be relatively thin or may be formed of such material as to render it resilient, for example, phosphor bronze or phosphor steel.

In the use of the stop, the operator may rotate the disc 25 by engaging one or both apertures 26 with a suitable tool to thread it into engagement with the ball 25. Disc 25 is normally perfectly flat when not in the stop, but when threaded sufficiently far inwardly of chamber 15, it will bow as shown in Figure 1 and thereby hold the plug 20 firmly seated. Because of its resiliency, the disc 25 will bend further than shown in Figure 1 so that it will not be broken when the plug is struck. With the disc 25 in contact with the ball 24, the plug cannot drop from the stop when the grease cap 27 is removed from insertion of grease in the lubricant chamber 15. Also, the disc 25 will hold the plug in firmly sealed position at this time.

Because the disc 25 is mounted entirely independently of the grease cap 27, inward rotation of the cap will not cause the disc 25 to be affected in any way. As a result, the grease cap 27 can be threaded inwardly to force additional lubricant into the groove system without increasing the pressure exerted by the disc.

The lubricating groove system disclosed in the drawing may be varied as desired. Also, a ball 24 need not be provided. However, the ball can be mounted in the boss 23 after the boss has been provided with a socket by the usual center drilling operation which is performed in order to enable the seating surface of the plug to be machined. On the other hand, if no ball is used, the lower surface of the boss 23 must be machined perfectly flat, in a plane normal to the plug axis, an operation requiring more care than the above-mentioned center drilling.

The terminology employed in the specification is for the purpose of description and not of limitation, the scope of the invention being indicated in the claims.

I claim:

1. In a valve, a casing including a flow passageway and a tapered seat extending transversely of the flow passageway, a tapered plug including a flow port and positioned in said seat, the casing being provided with a threaded bore extending axially from the larger end of the casing and providing seat to the exterior of the casing and providing a lubricant chamber, lubricant grooves in the seating surface communicating with the bore, an apertured resilient disc threaded in the inner portion of the threaded bore and having anti-frictional engagement with the larger end of the plug, and a cap threaded in the outer end of the threaded bore independently of the disc to close the lubricant chamber and whereby lubricant in the chamber can be placed under pressure.

2. A valve of the character described in claim 1 wherein the anti-frictional engagement between the plug and disc is provided by a ball carried by a socket in the plug and which ball engages the disc.

LUCIEN W. MUELLER.

REFERENCES CITED

The following references are of record in the file of this patent:

UNITED STATES PATENTS

| Number | Name | Date |
| --- | --- | --- |
| 1,365,116 | Martin | Jan. 11, 1921 |
| 1,932,322 | Nordstrom | Oct. 24, 1933 |
| 2,144,080 | Nordstrom | Jan. 17, 1939 |